United States Patent Office.

JOHN REYNOLDS, OF SAN FRANCISCO, CALIFORNIA.

Letters Patent No. 73,756, dated January 28, 1868.

PREPARATION OF DYES.

*The Schedule referred to in these Letters Patent and making part of the same.*

TO WHOM THESE PRESENTS SHALL COME:

Be it known that I, JOHN REYNOLDS, of the city and county of San Francisco, State of California, have made a new and useful Invention in the Preparation of Dyes, which I call Reynolds's Solution of Prussiate of Potash, being prepared and compounded in the manner hereafter described.

The nature of my invention consists in taking the article known as yellow prussiate of potash, and by preparing and composing by my process, I produce an article of superior quality, and at a much less amount of labor, and at a great reduction of cost.

Having described the nature of my invention, I will prelude a further description by stating that in some cases yellow prussiate of potash will not substitute for the red, but the red in all cases may be substituted for the yellow in the preparation of dyes. But my solution of prussiate of potash will substitute and take the place of either the yellow or red, and produce the result required.

In this mode of preparation, a larger amount of chlorine is retained, which, in the preparation of red prussiate of potash, is dissipated in the process of evaporation and exposure. This loss, by my process, is avoided, and by that means a great reduction in labor and cost is effected, and a superior article produced, being in value, as yellow prussiate of potash, a saving of nearly seventy-five per cent., in red prussiate of potash, fifty per cent. One hundred pounds of yellow prussiate of potash, or first crystillization, make four hundred pounds of my solution.

In the Pioneer Mission and Pacific Woollen Mills of San Francisco, one pound of my solution is found equal, as a dye, to one pound of yellow prussiate, and two pounds equal to one pound of red prussiate, besides making a faster and clearer color. It facilitates the dyer by being in solution, and leaves a clean card, instead of gumming, as with other articles used.

Process of Preparation.

I take yellow prussiate of potash, or the first crystallization, and dissolve in hot water, and make the solution to (20°) twenty degrees by Baume's hydrometer, then pass a stream of chlorine gas through the solution, but not more to be introduced than will prevent precipitation, as may be tested by persulphate of iron, when it is ready to be barrelled for shipment or use.

I claim a new article of manufacture in a preparation for dyes of the materials specified, and substantially as described.

San Francisco, November 1, 1867.

JOHN REYNOLDS.

Witnesses:
    JOSEPH H. ATKINSON,
    HENRY HAIGHT.